United States Patent [19]

Schneider et al.

[11] 3,966,395

[45] June 29, 1976

[54] PRESSURE ROLLER STAND FOR FORCIBLE LONGITUDINAL DISPLACEMENT OF LARGE ROTATING DRUMS

[75] Inventors: Heinrich Schneider, Bochum; Ernst Böser, Solingen, both of Germany

[73] Assignee: Klockner-Humboldt-Deutz Aktiengesellschaft, Germany

[22] Filed: Nov. 8, 1974

[21] Appl. No.: 522,146

[30] Foreign Application Priority Data

Nov. 9, 1973 Germany .......................... 2356038

[52] U.S. Cl. .............................. 432/103; 308/203; 432/104

[51] Int. Cl.$^2$ ...................... F27B 7/00; F16C 13/00

[58] Field of Search ........... 432/103, 104; 248/130; 308/234, 203, 204; 34/108; 241/178; 259/81 R

[56] References Cited

UNITED STATES PATENTS

| | | | |
|---|---|---|---|
| 2,819,130 | 1/1958 | Kaminsky | 432/103 |
| 2,884,287 | 4/1959 | Sommer | 308/203 |

FOREIGN PATENTS OR APPLICATIONS

| | | | |
|---|---|---|---|
| 611,813 | 1/1961 | Canada | 432/103 |
| 897,970 | 10/1953 | Germany | 432/103 |
| 1,962,678 | 6/1971 | Germany | 432/103 |
| 1,092,365 | 11/1960 | Germany | 432/103 |
| 1,080,131 | 4/1960 | Germany | 432/103 |

*Primary Examiner*—John J. Camby
*Assistant Examiner*—Henry C. Yuen
*Attorney, Agent, or Firm*—Hill, Gross, Simpson, Van Santen, Steadman, Chiara & Simpson

[57] ABSTRACT

A stand is provided to carry a pressure roller in horizontal engagement with a longitudinal surface of a raceway about a large rotating kiln or other drum, the roller being displaceable in a longitudinal direction to force the raceway to oscillate across its radial support rollers, thereby to increase the life of the raceway under wear from concentrated mechanical support stresses. An hydraulic cylinder selectively displaces the roller by acting on a frame on or in which the pressure roller is carried.

15 Claims, 6 Drawing Figures

PRESSURE ROLLER STAND FOR FORCIBLE LONGITUDINAL DISPLACEMENT OF LARGE ROTATING DRUMS

BACKGROUND OF THE INVENTION

This invention relates to a pressure roller stand with adjustable drive for forcible longitudinal displacement of a drum, such as a large rotary kiln, rotating on raceways.

Large drums, as for mixing, preheating, and cooling of bulk materials, are often rotated on two or more external, circumferential raceways, each supported on two bearing rollers. Mechanical stresses in the area of linear contact between each of the bearing rollers and the raceway lateral surfaces can be very high, wearing the raceways very rapdily and reducing outputs and service lives. To decrease the high wear rates of such raceways, it is known to construct the contact surface of the raceways broader than the bearing surfaces of the bearing rollers, and to move the rotary drum during operation forcibly to and fro in its longitudinal direction across the bearing rollers.

In the German Pat. No. 897,970 an apparatus is described for the longitudinal movement of a rotary kiln supported through raceways on bearing rollers, wherein the pressure rollers controlling the longitudinal movement are positioned eccentrically on a shaft pin, so that a gear driving the shaft pin displaces the pressure roller and thereby the rotary kiln.

German Laid Open Specification No. 1,962,678 shows an apparatus to effect longitudinal movement of a rotating drum supported through raceways on bearing rollers. A pressure roller engages the raceways for longitudinal guidance of the drum, the pressure roller being supported in a pressure roller housing. The housing has three guide elements displaceable longitudinally to exert an axial force on the drum.

These structures for longitudinal movement of a rotary drum have the disadvantage that the high axial forces applied load the pressure roller housing and the pressure roller supports with appreciable bending moments. Labyrinth seals arranged between the pressure roller housing undergo appreciable uncontrollable wear, so that in a short time, for example, cement dust may penetrate into the pressure roller bearings and cause damage to the bearings and breakage of the guide elements. Furthermore, the previous pressure roller housing constructions have an appreciable space requirement, so that expensive foundation work and high-priced raceway constructions were necessary to provide free space underneath the rotary drum for pressure roller stations.

An object of the present invention is to produce a pressure roller stand with an adjustable drive for the forcible longitudinal displacement of a drum or kiln rotating on raceways, which prevents the slight operational capacitance of the construction known from the state of the art and in which by means of a flat structural construction, costly and expensive constructions of foundations and raceways may be substantially avoided.

The problem is solved according to the present invention by the pressure roller being slideable on a frame in the longitudinal direction of the drum with respect to the foundation, and an adjustable drive engaging the frame in the plane of rotation of the pressure roller. The frame and the pressure roller are advantageously integrated into a structurally flat unit, so that simple assembly of the displacement unit is afforded. Thus it is possible particularly with rotary drums of large size to increase the pressure rollers' diameter and at the same time to adapt the pressure roller frame unit according to the invention to free space between the rotary drum wall and a raceway supporting surface. In this way high costs for foundation and raceway structures may be appreciably decreased.

The advantage of the flatly-constructed pressure roller stand is further increased by the reduced structural height of the raceways in that the axial force of moving of the drum supported by raceways on bearing rollers exerts smaller bending moments on the bearing rollers and thus the bearing rollers may be reduced in size and cost.

The pressure roller is arranged in its frame so that its plane of rotation is perpendicular to the plane of rotation of the raceways. By menas of this construction, both the axial force of the rotary drum and the displacement force of the adjustable drive take effect in the plane of the pressure roller and go through its center, so that bending moments on the pressure roller frame and the pressure roller bearings are entirely avoided and a simple and nevertheless nontorsional frame construction is allowed. In this way it is possible to maintain the seal of the pressure roller bearing with respect to the pressure roller housing so free from dust that a long lifetime of the bearing and with it a high reliability and economy of the entire installation may be attained.

Further, in accordance with the principles of this invention, the frame is slidable with respect to the foundation by means of slide rails and grooves, which are coated with a synthetic material of low coefficients of static and dynamic friction. The drive is connected between the slidable frame and the fixed foundation by means of spherical bearings which take up inaccuracies in alignment among the parts. The drive itself is conveniently a hydraulic piston device. The frame of the pressure roller has ventilating apertures for convection or forced-air cooling, and an insulating sleeve may be provided between the drum surface and the pressure roller frame. It is also contemplated by the present invention that an annular frame may be provided in an alternate embodiment for applications for very high yields of bulk materials, where forces required for axial displacements are very high.

Further details, features, and advantages of the invention will be explained in greater detail in the following specification on the basis of diagrammatic drawings of the embodiments by way of example of a pressure roller stand according to the invention.

DESCRIPTION OF THE PREFERRED EMBODIMENT

Figure 1:
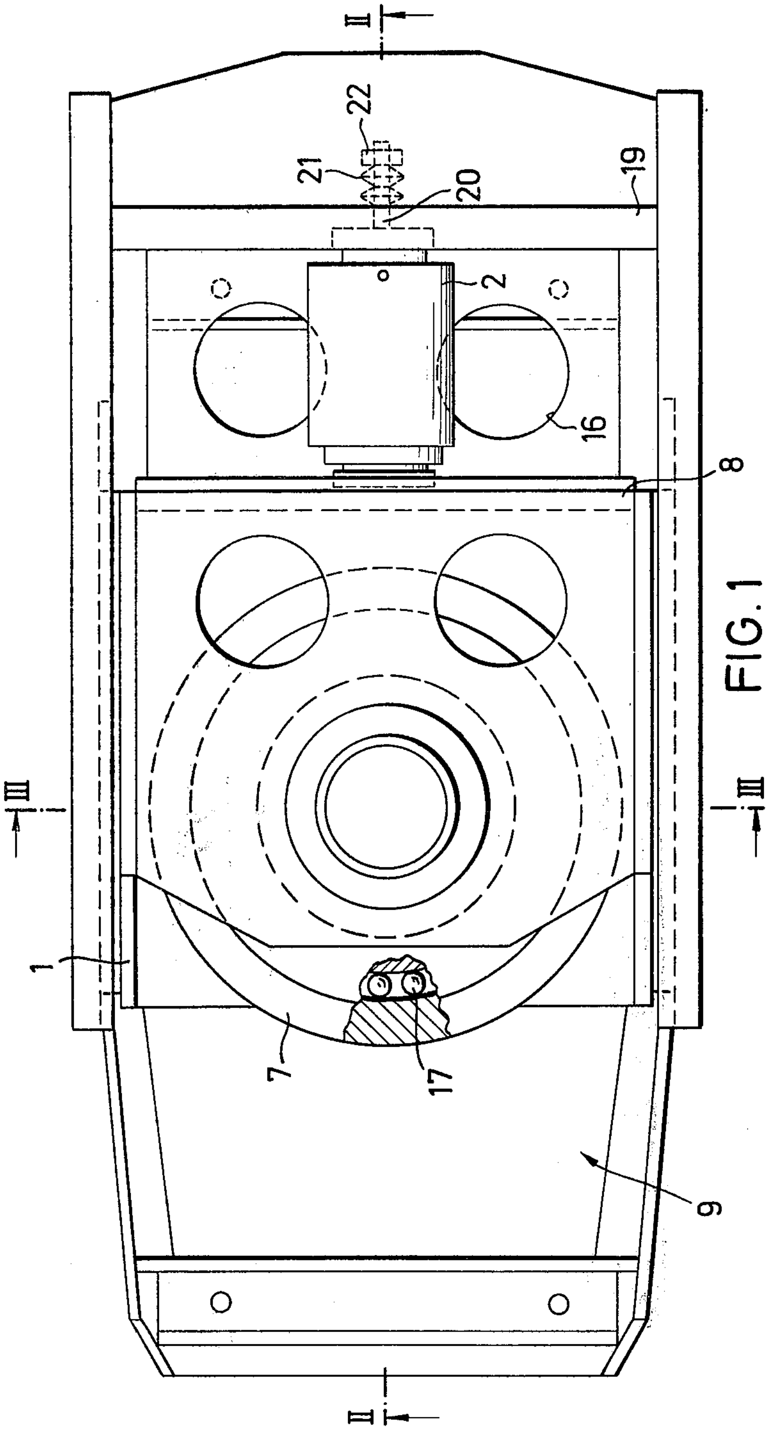
FIG. 1 shows in plan view one embodiment of the pressure roller of the invention.
Figure 2:
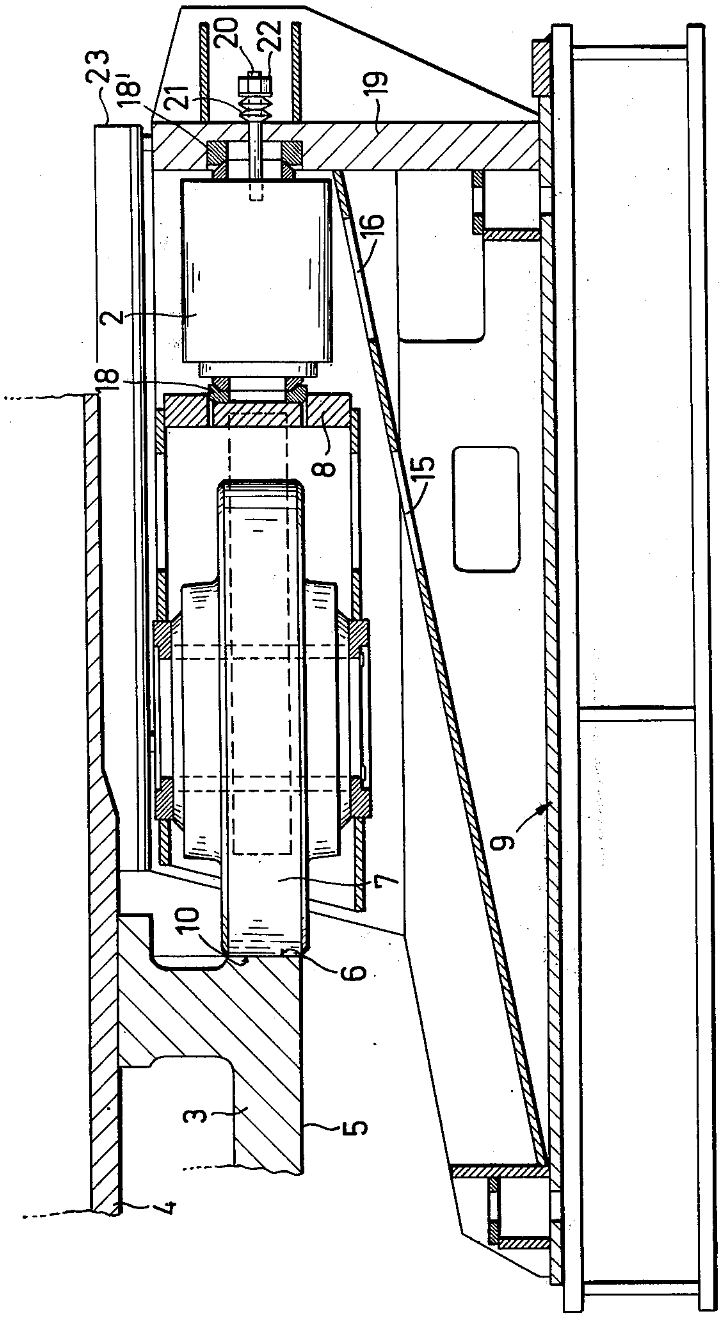
FIG. 2 shows an axial section along the line II—II of FIG. 1 through the pressure roller stand of the invention.
Figure 3:
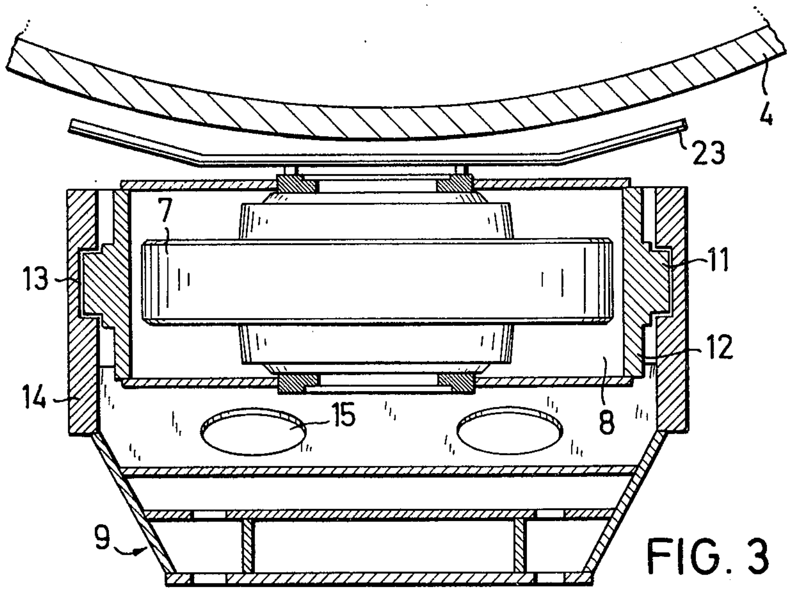
FIG. 3 shows a radial section along the line III—III of FIG. 1 through the pressure roller stand of the invention.

FIGS. 1 to 3 show a pressure roller stand 1 with an adjustable drive 2 for the axial displacement of a drum rotating on raceways 3. The raceways 3 are arranged radially outwardly of a drum wall or sleeve 4. The rotating drum is supported on bearing rollers not shown, whereby roller contact is provided between a radially-facing surface 5 of the raceway 3 and the supporting rollers.

A longitudinal surface 6 of the raceway 3 is engaged by a pressure roller 7, positioned in a frame 8 which is slidable with respect to the foundation 9, said frame being connected to the adjustable drive 2. Through the adjustable drive 2, the pressure roller 7 is moved in a longitudinal direction of the rotary drum by predetermined amounts, so that over several revolutions of the drum all of the contact surface 5 of the raceways 3 is passed over by the bearing rollers, to avoid rapid wear of the raceway surface. The adjustable drive 2 engages the frame 8 substantially in the plane of rotation of the pressure roller 7.

The pressure roller 7 is arranged in the frame 8 in such manner that its plane of rotation extends perpendicularly to the plane of rotation of the raceway 3. Preferably the pressure roller 7 has a cylindrically-shaped contact surface 10 which is disposed in rolling contact with the annular longitudinal surface 6 of the raceway 3. It is, however, also possible, without departing from the scope of the invention, to permit the pressure roller 7 to be provided with a truncated cone-shaped contact surface which is then located in roller contact with a lateral surface 6 of the raceway 3, if need be, constructed annularly accordingly.

As shown in FIG. 3, the pressure roller frame 8 is slidably connected with the foundation 9 through slide rails 11 and slide grooves 13 which are preferably arranged in the plane of rotation of the pressure roller 7 and extend in the direction of the plunger of the adjustable drive 2. The slide rails 11 may in this connection be welded in simple manner to the side walls 12 of the frame 8 and engage in the manner of a fitted spring guide in the slide grooves 13 which are admitted in the lateral guide walls 14 of the foundation 9. The slide rails 11 and slide grooves 13 are preferably of large sizes and are coated with a synthetic material of low kinetic and static coefficients of friction, which may be selected with advantage from the group of polytetrafluoroethylenes. Thus high durability and low wear may be achieved economically.

The pressure roller frame 8 which surrounds the pressure roller 7 in the manner of a housing and the foundation 9 may have in the frame walls and foundation walls ventilating apertures 15 and 16, respectively. The foundation-ventilating apertures 16 may be provided with a ventilating blower, not shown, which forces cooling air through the foundation 9 to the pressure roller frame 8, so that the sliding connection of the frame 8 with the foundation 9 the bearings 17 of the pressure roller 7 and the adjusting drive 2 may be protected from disturbing temperature influences.

The pressure roller frame 8 is in accordance with the invention connected with the adjusting drive 2 on the end through a spherical supporting bearing 18. The adjustable drive is also movably connected through a spherical supporting bearing 18' with the foundation 9. Construction and operation of these spherical supporting bearings 18, 18' are conventional and do not need to be explained here in greater detail. This advantageous measure makes possible a simple mounting and demounting of the frame, adjustable drive, and foundation, as these structural units may be connected with one another while maintaining economical finishing-tolerances: possible misalignments and large installation tolerances may be equalized to advantage. Also, the adjustable drive is loaded exclusively through compression forces, so that these parts may be favorably sized.

The adjustable drive 2 preferably consists of a hydraulically-acting piston-cylinder unit which is powered by a pressure source, not shown, for the control frame 8 and of the pressure roller 7, and thereupon the necessary longitudinal displacement of the rotary drum may be accurately adjusted according to a predetermined pattern. Preferably, the cylinder unit of the adjusting drive 2 is releasably connected with the supporting wall 19 on a front side of the foundation 9. An arm bolt 20 is inserted in the center unit which is conveyed through the supporting bearings 18' and is connected with the supporting wall 19 of the foundation 9 through a spring arrangement 21 and fastening nut 22. This arrangement has the advantage that for mounting or demounting, the frame 8 and the pressure roller 7 may be pushed out of the sliding connection as a structural entity without releasing the adjustable drive 2 from its connection with the foundation.

In the area beneath the drum sleeve 4 and above the pressure roller 7 and the adjustable drive 2 is arranged a cooling- or insulating-shield 23, adapted approximately to the radius of curvature of the rotary drum, and which extends suitably across the entire pressure roller stand and consists simply of a sheet metal construction coated with asbestos, which on the one side is connected with the slidable frame 8 and, on the other side, is slidably supported on the foundation 9, so that the pressure roller stand is protected independently of the raceway position from dangerous temperature influences.

Figure 4:
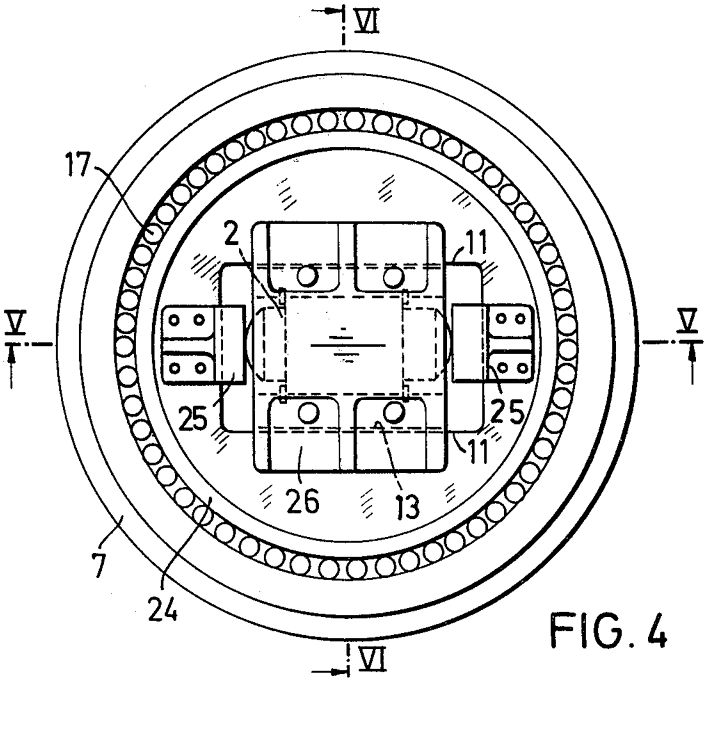
FIG. 4 shows in plan view a second embodiment of the pressure roller stand of the invention.
Figure 5:
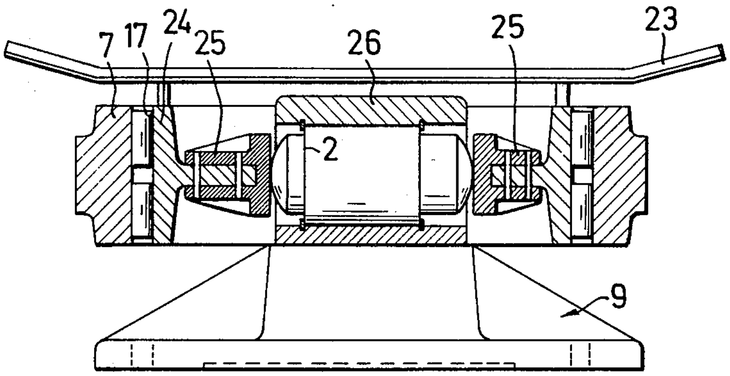
FIG. 5 shows an axial section along the line V—V of FIG. 4.
Figure 6:
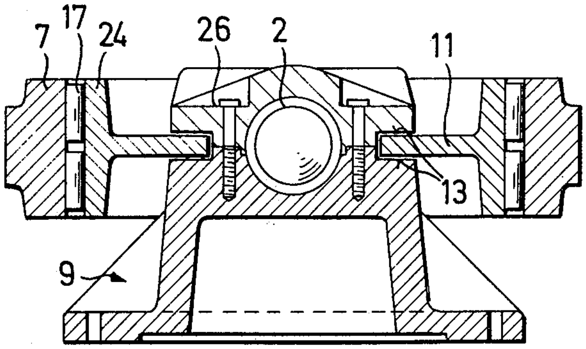
FIG. 6 shows a radial section along the line VI—VI of FIG. 4.

In FIGS. 4 and 5 is shown an alternate embodiment of a pressure roller stand for the forcible longitudinal displacement of rotary drums of large diameters and capacities. In accordance with the invention, the frame is annularly constructed to form a stationary pressure roller ring 24 on which is supported a pressure roller bearing 17 for rotation of the pressure roller 7. The pressure roller ring 24 has on its interior side two supporting surfaces 25 diametrically opposite one another which are arranged centrally and in the plane of rotation of the pressure roller 7 on the pressure roller ring 24. Through these surfaces, the adjustable drive 2 is supported on a fixed foundation bearing mount 26. This foundation bearing mount 26 projects into the pressure roller ring 24 and, as shown in FIG. 6, has a sliding connection in the rotary plane of the pressure roller 7 and in the direction of the plunger of the adjustable drive 2, said connection slidably joining the pressure roller ring 24 and the foundation bearing mount 26 in the manner of a fitted spring guide through the slide rails 11 and slide grooves 13. The adjustable drive 2 is again in connection with a pressure source for the longitudinal displacement of the pressure roller 7, said pressure transmitter not being shown.

In accordance with the invention, it is of advantage with pressure rollers of large diameter to replace the installation of the expensive pressure roller bearing 17 with hydraulically supporting slide bearings or to coat the sliding surfaces of pressure roller ring 24 and the pressure roller 7 with a material of low kinetic coefficient of friction, as with a synthetic material from the group of the polytetrafluoroethylenes. The insulating shield 23 may again be supported on the pressure roller ring 24 and shields the pressure roller against heat from the drum.

The construction of the pressure roller stand according to the invention is not limited only to the embodiments shown by way of example in the specification and the drawings, but it also permits arranging on existing foundations in free spaces between drum sleeves and foundations, a pressure roller at an angle to the longitudinal axis of the drum, whereby the sliding connection between frame and foundation and the adjustable drive movements are in the plane of rotation of the pressure roller. With advantage, two or more co-axial adjustable drives may also engage the pressure roller frame, the drives being supported in the frame of the pressure roller lying on the supporting wall 19 of the foundation 9. It also lies within the scope of the invention to permit the pressure roller stand according to the invention to engage not only one side of the side surfaces 6 of the raceways 3, but it is likewise possible for the prevention of impermissibly high bending moments on the bearing rollers to correlate pressure roller stands with two parts of the surface 6 of the raceway 3. Furthermore, it is within the concepts of the invention that a pressure roller stand in a very hot zone of a rotary kiln may have in addition to a temperature shield and ventilation apertures walls through which a cooling means with high heat transfer characteristics may be placed, so that thereby it is made certain that the temperature-sensitive bearing and sliding connections lie in each case in temperature ranges safe for operation.

Although various modifications might be suggested by those versed in the art, it should be understood that I wish to embody within the scope of the patent warranted hereon all such modifications as reasonably and properly come within the scope of my contribution to the art.

We claim as our invention:

1. A pressure roller stand for forcing longitudinal displacement of a heavy industrial drum, the drum being rotatable via an annular raceway thereabout and said raceway having a longitudinally-facing surface, said roller stand being mounted on a foundation adjacent said surface of said annular raceway and beneath said drum, and carrying adjustable drive means thereon, and being characterized by:

a frame slidable along a frame axis within said stand with respect to said foundation;

a pressure roller carried rotatably in said frame in a plane of rotation which includes said frame axis and having a peripheral pressure surface engageable with said raceway longitudinal surface for rotation therewith transversely to said frame axis; and the drive means selectively applying a displacement force between said foundation and the pressure roller substantially in a plane of rotation thereof and through said slidable frame along said frame axis, thereby to afford longitudinal displacement of said heavy drum with substantially no bending moment applied to said frame.

2. A pressure roller stand as defined in claim 1, further characterized by the pressure roller being mounted in its frame to rotate in a plane extending perpendicularly to the plane of rotation of the raceway.

3. A pressure roller stand as defined in claim 1, further characterized by the pressure roller frame being supported by and shifting relative to the foundation on cooperating slide-rails and slide-grooves which are formed parallel to the plane of rotation of the pressure roller in the stand and frame.

4. A pressure roller stand as defined in claim 1, further characterized by the pressure roller frame being movable by the adjustable drive means, and the adjustable drive means engaging the foundation through spherical support bearings.

5. A pressure roller stand as defined in claim 1, further characterized by the drive means having an hydraulically acting piston cylinder unit.

6. A pressure roller stand as defined in claim 1, further characterized by the slide-rails and slide-grooves being coated with a synthetic material having low coefficients of friction.

7. A pressure roller stand as defined in claim 6, the synthetic material being from the group of polytetrafluoroethylenes.

8. A pressure roller stand as defined in claim 1, further characterized by the pressure roller frame enclosing the pressure roller and having surfaces defining ventilating apertures through walls of the frame.

9. A pressure roller stand as defined in claim 1, further characterized by the pressure roller frame comprising an annular pressure roller ring rotatably supporting the roller.

10. A pressure roller stand as defined in claim 9, further characterized by the drive means being affixed to a foundation bearing mount which slidably engages and carries said pressure roller ring.

11. A pressure roller stand as defined in claim 9, further characterized by the pressure roller ring having a slide surface, said surface being located between the roller ring and the foundation bearing mount, said surface being coated with a material having low coefficients of friction.

12. A pressure roller stand as defined in claim 11, further characterized by the synthetic material being from the group of polytetrafluoroethylenes.

13. A pressure roller stand as defined in claim 1, further characterized by the pressure roller frame having an insulating sleeve arranged between the drum wall and the pressure roller.

14. A pressure roller stand as defined in claim 1, wherein said frame carries said pressure roller on an axle, characterized by the frame engaging said axle on either side of said pressure roller.

15. A pressure roller stand with a drive means for forcing longitudinal displacement of a heavy industrial drum rotating on annular raceways adjacent a foundation, comprising:

a pressure roller rotatable on an axis transverse to the axis of said heavy drum for engagement with an axially facing surface on one of said annular raceways of the drum; and a drive means connected to said pressure roller for applying a force thereto transverse of its axis of rotation forcing said roller against the raceway, said drive means connected to the roller to apply a force transverse of the roller axis and through the axial center of its axis and in alignment with the reaction force between the roller and raceway so that lateral force couples are absent which would create wear on the roller, and wherein said drive means is connected to the pressure roller by a displaceable ring central to said pressure roller and on which said pressure roller rotates.

* * * * *